(12) United States Patent
DeVito

(10) Patent No.: US 7,897,932 B2
(45) Date of Patent: Mar. 1, 2011

(54) IDENTIFICATION AND LOCALIZATION OF RADIOISOTOPES

(75) Inventor: Raymond P. DeVito, North Logan, UT (US)

(73) Assignee: Utah State University, North Logan, UT (US)

(*) Notice: Subject to any disclaimer, the term of this patent is extended or adjusted under 35 U.S.C. 154(b) by 184 days.

(21) Appl. No.: 12/436,987

(22) Filed: May 7, 2009

(65) Prior Publication Data

US 2009/0256080 A1    Oct. 15, 2009

Related U.S. Application Data

(63) Continuation-in-part of application No. 11/413,480, filed on Apr. 28, 2006, now Pat. No. 7,550,738.

(60) Provisional application No. 60/676,082, filed on Apr. 28, 2005.

(51) Int. Cl.
    G01T 1/20    (2006.01)

(52) U.S. Cl. .............................................. 250/370.11
(58) Field of Classification Search ................. 250/393, 250/370.01–370.15, 338.1, 336.1, 353; 600/436
    See application file for complete search history.

(56) References Cited

U.S. PATENT DOCUMENTS 6,484,051 B1 * 11/2002 Daniel ........................ 600/436

* cited by examiner

*Primary Examiner*—David P Porta
*Assistant Examiner*—Kiho Kim

(57) ABSTRACT

A radiation detection, localization, and identification system uses a searching algorithm to identify geometric correlation of hypothetical solutions to Compton Imaging. Geometric correlation of correct associations of gamma ray energies with each detected event yields the identity and location of radiation sources. The system's detector is an array of radiation detectors networked to act as a single detection system. This network has wide area of view and high sensitivity to radiation sources since no collimation is required.

23 Claims, 9 Drawing Sheets

IDENTIFICATION AND LOCALIZATION OF RADIOISOTOPES

RELATED APPLICATIONS

This application is a continuation-in-part of application Ser. No. 11/413,480, filed Apr. 28, 2006 now U.S. Pat. No. 7,550,738, and titled "Nuclear Material Identification and Localization", which claims priority to U.S. Patent Application No. 60/676,082 filed on Apr. 28, 2005, both of which are incorporated herein by reference.

TECHNICAL FIELD

The present invention relates to radioisotope identification methods and devices and to radioisotope localization methods and devices

BACKGROUND

Conventional monitoring techniques involve detection of emitted characteristic radiation, the identification of the energy of those emitted radiations and correlation of the measured energy or energies to the known emissions spectra of candidate radioisotopes. Various imaging techniques can be used in conjunction with the energy spectroscopy including physical collimation of the incident radiation, coded aperture arrays and conventional Compton cameras.

Detection methods such as gamma ray spectroscopy are sensitive and highly developed for determining the presence and radionuclide composition of radioactive materials. Gamma ray spectra are therefore useful for identifying a radioactive material, but not for locating it. Current methods for locating radioactive sources typically rely on collimators or intensity measurements at several positions, and require long data acquisition times due to low counts when the radioactive sources are shielded.

SUMMARY

Disclosed are embodiments of methods for identifying the type and location of radioactive material. In one embodiment, multiple radiation detectors surround the area of inspection and record interactions involving Compton scattered events. A spatial correlation method is employed to identify the location and type of material based on a geometric convergence of possible backprojected paths. Searching is accomplished using a list of known emissions lines for radioactive material of interest.

Most identification techniques measure emitted energies and then make use of the known energy spectrum for emitted gamma rays to attempt to identify the measured lines with known lines and thereby identify the isotope. However, shielding of the contraband source will make only high energy gamma rays assessable for detection. Systems capable of identifying and locating the illicit transport of radioactive material can be thwarted by concealment efforts that block characteristic emissions. We disclose a system that utilizes a spatial correlation of projection vectors arising from Compton scattering of any emissions, but especially of, the high energy emissions. Source identification and location is supplied by a reconstruction that searches for solutions with radioactive material of unknown type. Detection does not require full energy deposition.

DETAILED DESCRIPTION

A radiation detection, localization and identification system is disclosed. A dispersed array of radiation detectors is networked to act as a unified detection system. This network has a wide area of view and high sensitivity to radiation sources. The system, a Compton Radiation Detector system, utilizes the properties of Compton scattering for high energy gamma radiation. Rather than the traditional reliance on measuring full energy interactions for identification and possible localization, the Compton Radiation Detector system uses a geometric correlation to identify and localize radiation sources.

The disclosed system works for all gamma ray emitting radioisotope sources but especially well for sources with high energy emissions emerging, such as shielded strategic nuclear material (SNM). Current systems using total energy identification work best for lower energy gamma rays, where full energy absorption is more probable. However, shielding used to conceal radioactive material also works best for lower energy gamma rays and relatively poorly for high energies. It is the same high energy gamma rays that are difficult to shield that also produce the geometric signature used by the Compton Radiation Detector system. An intentionally concealed radiation source will still be visible by its high energy emissions.

Figure 1:
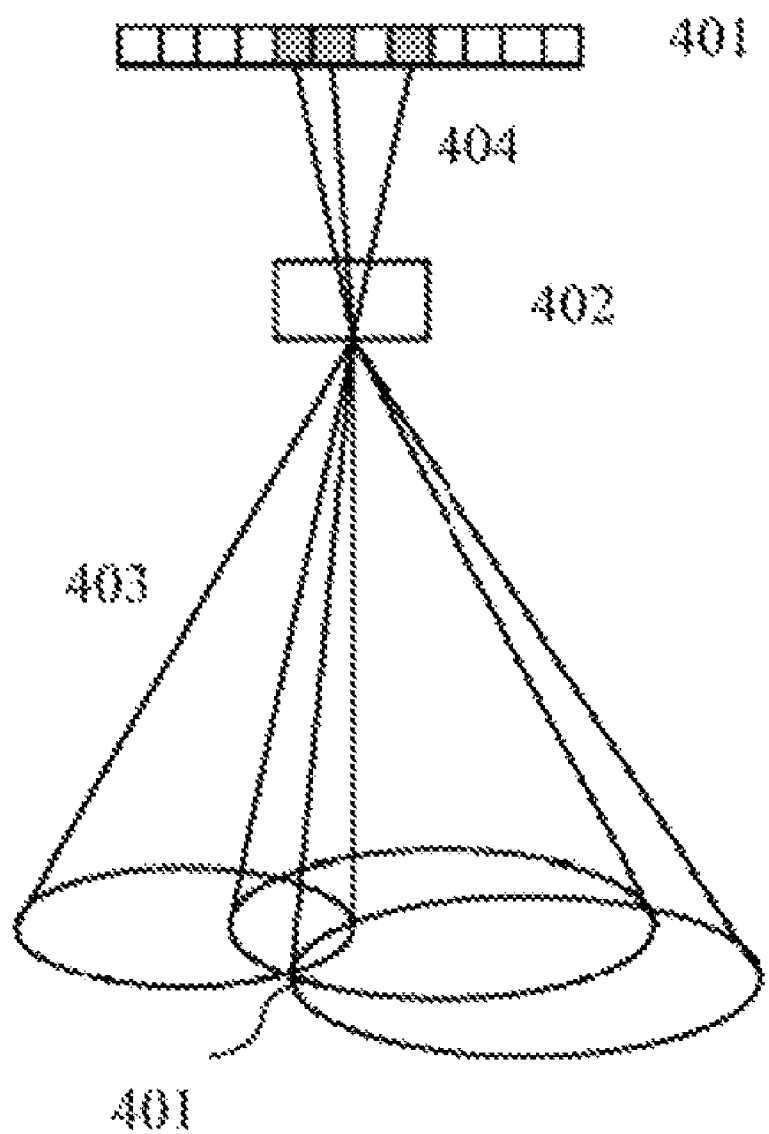
FIG. 1 shows diagram of conical surfaces from three detector events backprojected from measurement of scattered photon energy at a single-point-of-observation detector system indicating the most probable location of the source at the intersection of the circles.
Figure 2:
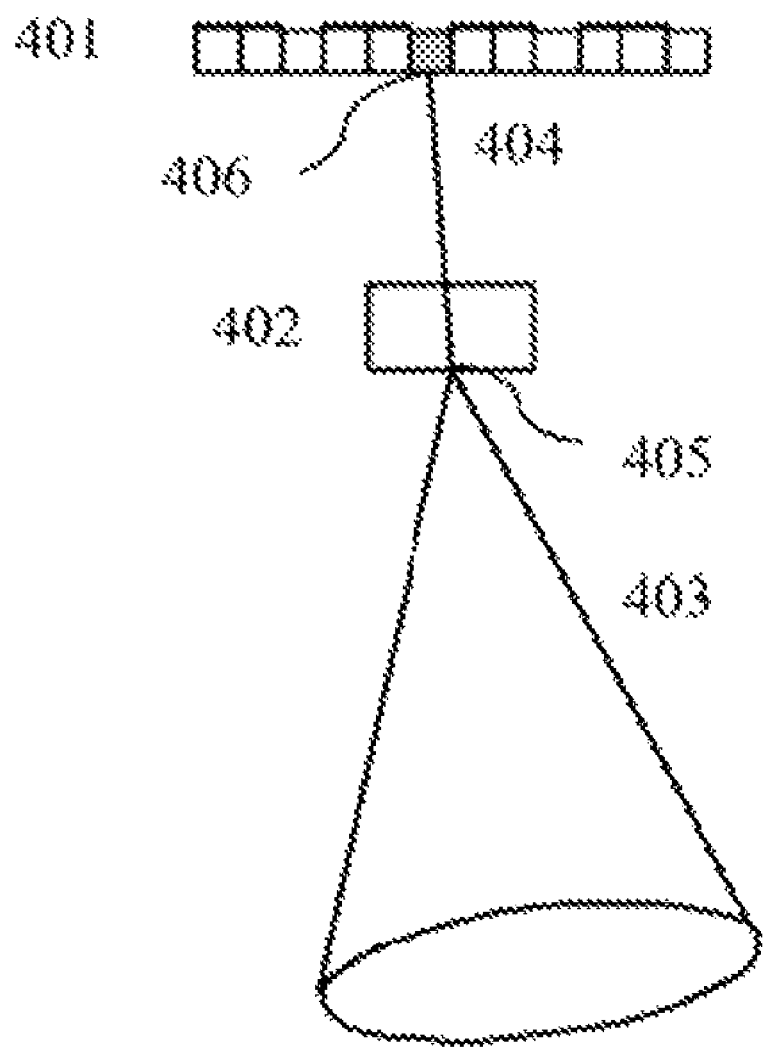
FIG. 2 shows diagram of a conical surface backprojected from measurement of scattered photon energy at a single-point-of-observation detector system.
Figure 3:
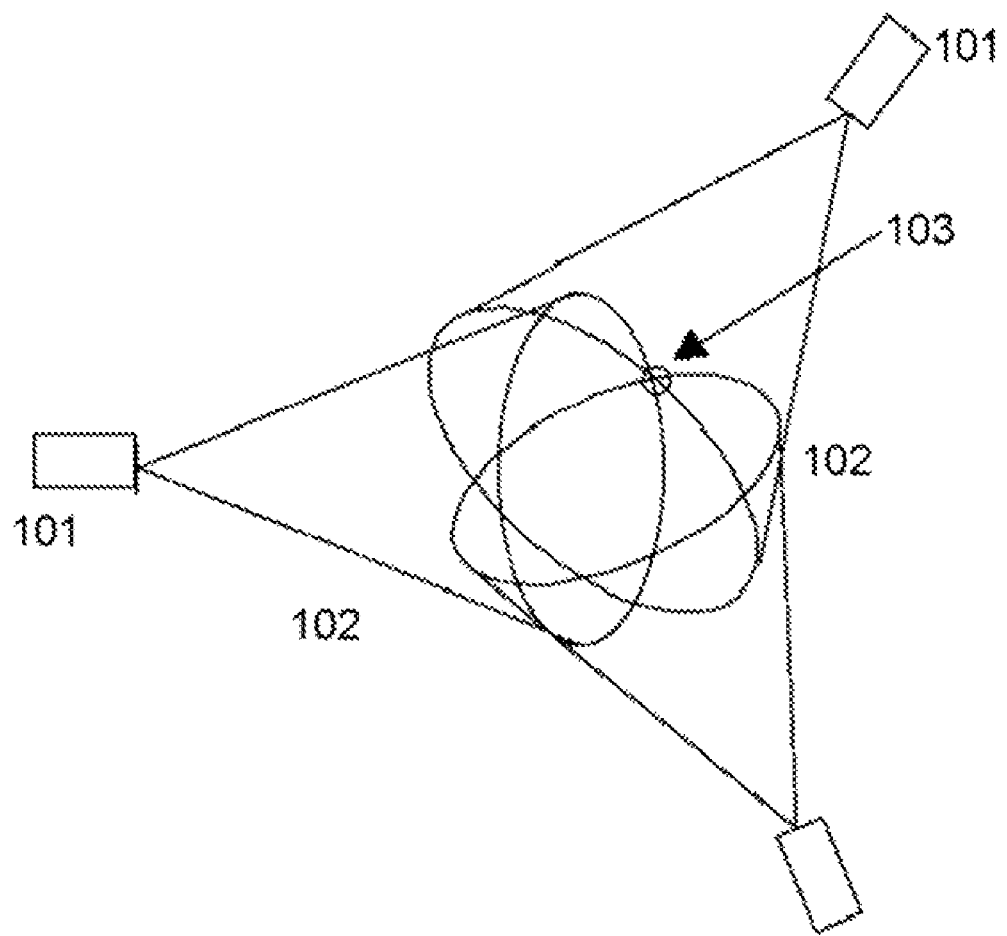
FIG. 3 shows the detector system dispersed around control area. Backprojected Compton cones intersect at the radioisotope source location showing how the intersection of backprojected cones determines the location of a radioactive material.
Figure 4:
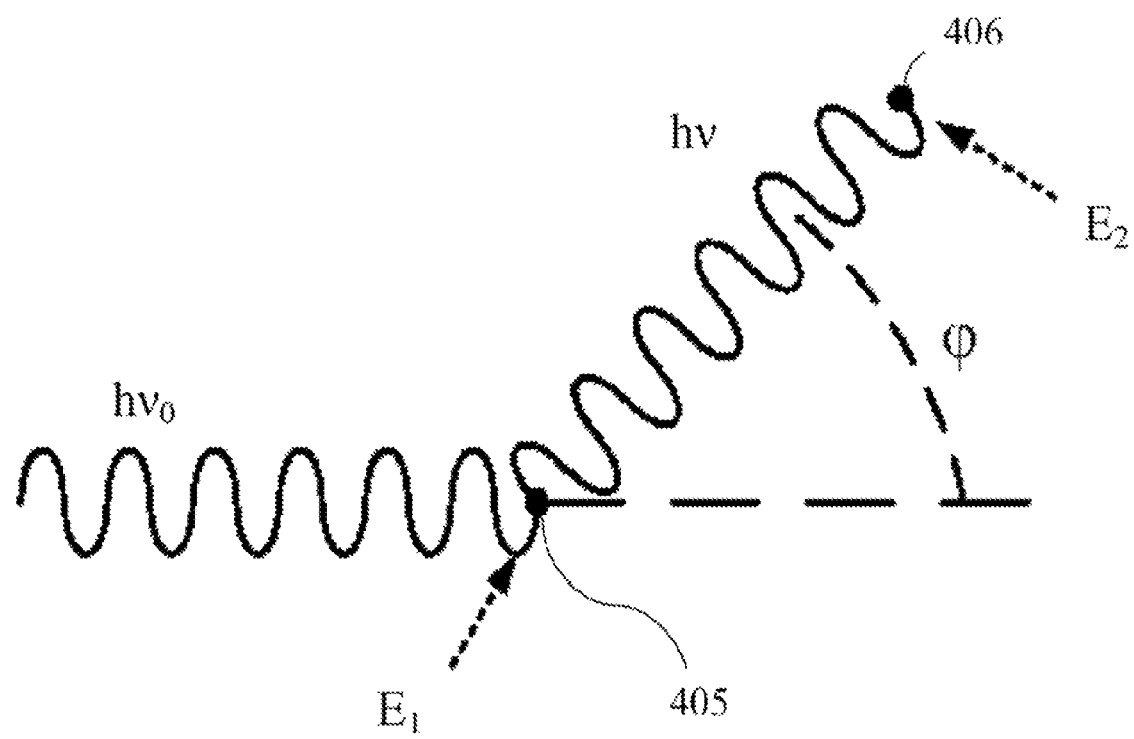
FIG. 4 is a diagram of Compton scatter kinematics.
Figure 5:
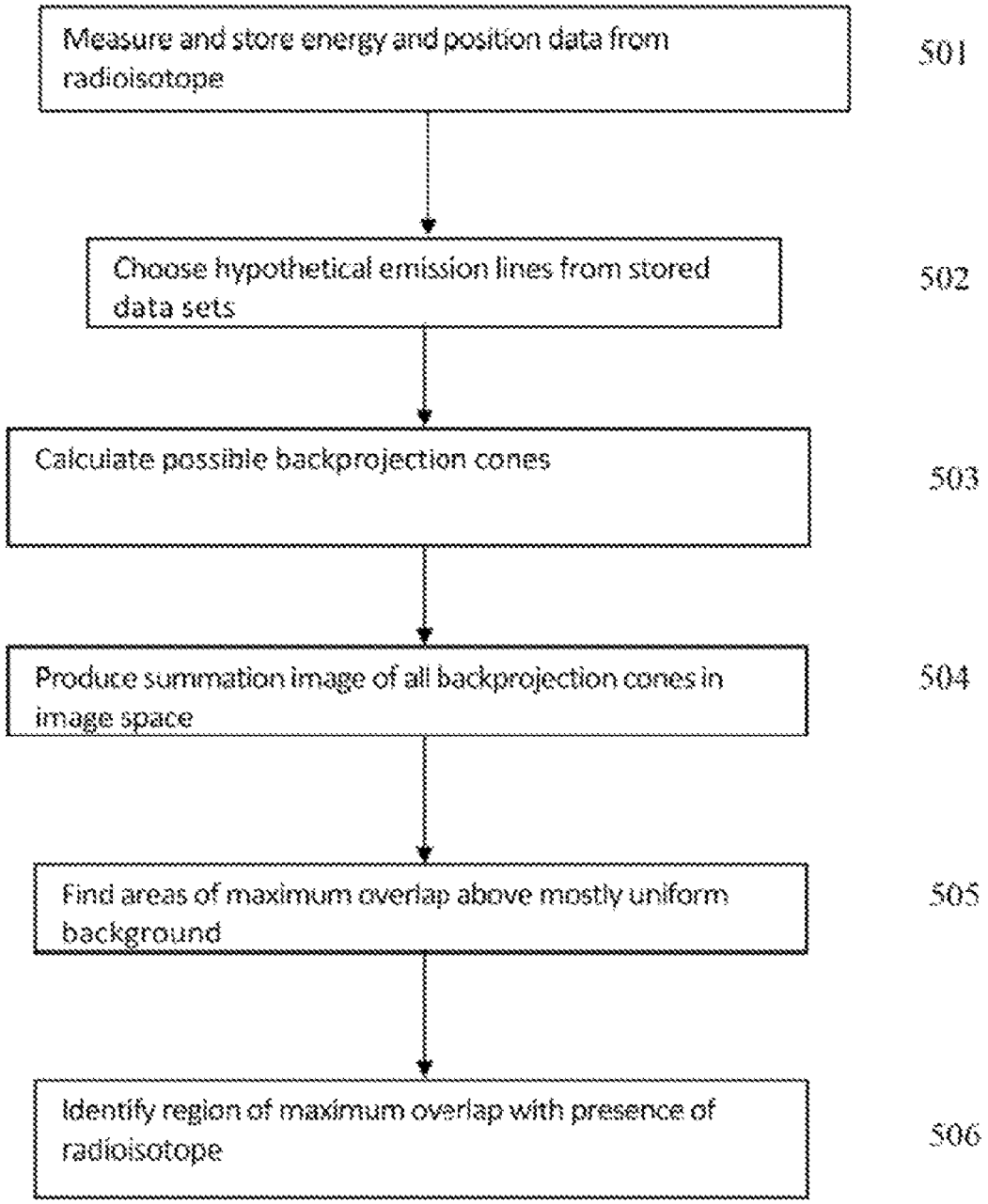
FIG. 5 is a flow chart showing the data analysis and processing for creating an image space corresponding to true and random backprojection cones.

In one embodiment the deployment of the Compton Radiation Detector system is accomplished by stationing a plurality of small radiation detectors with three-dimensional and multiple-interaction-point functionality around the area to be monitored as illustrated in FIG. 1. These detectors 101 are relatively inexpensive to produce compared with large detector systems typically used for full energy measurements. System sensitivity and area of coverage can be scaled by adjusting the number of individual detector stations 101. Data from the multiple locations are collected in an analysis station to produce alerts when suspicious material is detected. The Compton Radiation Detector system will continue to operate (at slightly reduced sensitivity) even if individual detector modules 101 become inoperable. In contrast, conventional full energy systems that rely on single large detectors will become fully inoperable with detector failure.

In another embodiment the area to be interrogated is viewed from one location by a detector system with 3-D event localization capability. In another embodiment a mobile detector system or systems can move around the area of interest and record events. In yet another embodiment a combination of mobile and stationary detectors can be used to acquire the data.

The Compton Radiation Detector network operates is a very different mode than conventional radiation detection and localization systems. Each detector 101 has three dimensional event localization capability and the capability to measure individually multiple interaction points occurring simultaneously in the detector module. Each 3-D radiation detector 101 detects Compton scattered events, identifying the primary 405 and secondary 406 interaction vertices. While the detector module 101 identifies the energy and three dimensional positions for the two interaction vertices, the detector module 101 does not need to identify which vertex is the primary and which is the secondary. The detected coordinates are used by the analysis engine to search for combinations of primary and secondary that are consistent with known physical scattering properties of gamma ray emissions from suspect radioactive material.

Capturing the entire energy for high energy emission is very difficult, large detection volumes are necessary, leading to expensive and bulky systems. The disclosed detection and localization system does not require detection of the full energy of each event to alert to the presence of a radioactive source, localize the source and identify the radioisotope.

The Compton Radiation Detector system benefits from the fact that Compton events are easier to detect than full energy events for high energy emissions. We obtain information on the direction of the original gamma ray if the primary 405 and secondary 406 interaction points for Compton events are measured. The interaction point 405 is a first interaction of the incoming gamma ray and interacts with the detector 402 by a Compton scattering interaction. A scattered gamma ray 404 (the Compton scatter secondary) emerges from the detector 402 and interacts in a second detector 401. The interaction in detector 401 may be any interaction that deposits energy in the detector, i.e. may be a Compton interaction of the scattered gamma ray, may be a photoelectric absorption with or without x-ray release from the detector or may interact by pair production. In interaction 401 the event may have interacted by leaving either full or partial energy of the Compton scatter secondary. While measuring full energy of the gamma ray is difficult, we start with the exact knowledge of the potential energies of gamma rays we are interested in detecting, e.g., weapons grade Uranium has a known set of gamma rays associated with it, Plutonium has another set, and other radioisotopes each have their own set of unique gamma ray emissions. The use of coincidence in a single detector 101 or among detectors 401, 402 greatly reduces the random background. Looking for additional geometric correlation further reduces the false positive rate and provides a very reliable detection system. Further investigation by secondary methods (e.g. security personnel) of the source is made easier since localization of the source position and identification of the material is provided.

Detector systems to measure energy, timing and three dimensional position from gamma ray interactions are well know to those skilled in the art. Detector systems vary in their energy and position resolution, timing resolution, in their stopping power characteristics and in their cost. Choice of detectors will vary as one selects the target resolution and sensitivity desired while balancing cost considerations. The system described here will work for any of the detector choices made while performance results will vary accordingly.

Possible detector systems are: CsI(Tl) segmented detector using Photo Multiplier Tubes (PMTs), CsI(Tl) segmented detector using pin diodes, CsI(Tl) segmented detector using avalanche diodes, NaI(Tl) segmented detector using PMTs, NaI(Tl) single crystal planes using PMTs (similar to a conventional gamma camera), CsI(Tl) single crystal planes using PMTs (similar to a conventional gamma camera), BGO segmented detector using PMTs, LSO segmented detector using PMTs, Silicon pixilated detector, Intrinsic Ge pixilated detector, CZT pixilated detector planes, CZT volumetric detector, gas scintillation detectors or gas proportional detectors. Other similar gamma ray detectors can be used within the scope of this invention as would be understood by one of ordinary skill in the art of gamma ray detection.

Gamma rays from an external source can penetrate shielding (if present) and may interact in the radiation detector. The gamma ray produces a light scintillation or liberates charge in the detector material to make an electronic readable signal. This signal is processed to produce position and energy information for the event vertex.

The detectors provide measurement 601 of energy and position and event timing information. Timing information is used to measure relative time between two or more distinct interactions in the detector. If the two or more distinct interactions are from a single Compton scatter event, the relative timing of the events will be within the time for photons to traverse the distance between the event positions, usually on the order of a nanosecond. The timing resolution of the detectors is usually greater than this. Possible detector timing effects, such as charge transport or electronics response can make the coincidence window larger. One sets a coincidence time window to allow simultaneous events to be registered as possible multiple vertices from a single Compton scattering event. Multiple vertices can arise from two separate events that happen to interact in coincidence. The probability that accidental coincidences occur is a function of detector count rate. For most applications the count rate is very small, making accidental coincidences very rare.

The measured energy, timing or coincidence, three dimensional positions are recorded for further processing in a data storage device 602, 501. Most typically this data storage device will be the storage memory of a computer, such as a hard disk drive or into other digital memory of the computer. Alternative means to store data may be used if it provides the capability to further process the data as described in this specification. Timing information is used to determine if there is coincidence between two or more interaction vertices. Timing information for each vertex can be stored or simply an indication that the vertices are connected in coincidence may be used. The timing information establishes that the vertices are part of the same Compton scatter event. Energy data is typically produced as the channel output from an ADC and the digital channel is stored or can be converted to another scale such as a calibrated energy value. Energy calibration may occur here but can also occur later in the processing in connection with or prior to looking up hypothetical gamma lines 502. When multiple detectors are used as the gamma ray detector then a detector identifier or equivalent will be recorded with the event information. If a mobile detector is used, either alone or with other detectors (mobile or stationary) then the detector identifier (if more than one detector) and position of mobile detectors will be recorded. Position measurement of the mobile detectors can be accomplished by several techniques including GPS signals, encoded position readouts, RF tagging, optical systems and other means known to those skilled in the art or yet to be developed.

Events are selected from the date pool 602 following a variety of mechanisms. In one embodiment the events may be analyzed in the time sequence that they are acquired. In another embodiment the events may be analyzed following a predetermined algorithm that allocates certain energies or energy ranges more significant than others. The more significant events are selected and analyzed first in anticipation of more quickly ascertaining the identity of the radioisotope or radioisotopes. Alternatively the events may be selected in a totally random mode, or in a mix of methods. Other means of selecting event order that can accomplish the same function are within the scope of this invention.

This system uses the knowledge of the known gamma ray emissions from suspected radioisotopes 603. The emission gamma rays are cataloged and available to those skilled in the art or nuclear spectroscopy or radioisotope identification. In addition to the energy of the gamma rays the relative emission strengths of the emission gamma rays can be included if available. One such depository of emission gamma rays is the National Nuclear Data Center of the National Institute of Standards and Technology (NIST) of the United States Department of Commerce. This emission gamma ray data is loaded into the system in a readable form 603. The most common means to store this information is into the storage memory of a computer such as a hard disk drive or into other digital memory of the computer. Other means that can accomplish the same function are within the scope of this invention.

Within the calculation of possible backprojection cones arising from a set of vertices, the energy of the original gamma ray is typically unknown. If energy information is available for both vertices then the energy of the original gamma ray associated with a set of Compton vertices is equal to (in consideration of detector energy resolution limitations) or greater than the sum of the energies corresponding to the set of vertices. From the set of possible gamma ray lines under consideration for the particular radioisotope identification and localization task engaged a possible gamma ray line is chosen 605, 502 whose energy is equal to or greater than the measured energy for the event. From the subset of emission lines with acceptable energy, multiple methods of selection are possible. In one method, all acceptable emission lines are chosen for backprojection calculation. Then each cone is calculated and backprojected with equal weights to form a total image. In another method using all the acceptable emission lines the cones are backprojected using weights proportional to emission branching ratios and energy dependent detector efficiency. Another method will use emission lines from a single isotope and backproject them either with or without a weighting factor.

The equation for Compton scattering relates the angle the photon is deflected from its path ($\phi$) to the energies of the scattered (hv) and incident ($hv_0$) photons:

$$\varphi = \cos^{-1}\left[1 - m_0 c^2 \left(\frac{1}{hv} - \frac{1}{hv_0}\right)\right].$$

Equation 1

This angle provides the basis for all reconstruction algorithms involving Compton scattering. If the scattered photon energy is known, the angle of deflection can be obtained from knowledge of the incident photon energy. Since any azimuthal deflection is possible the direction of the initial photon in three-dimensional space can be limited to a cone 403. Note the direction of the final photon also is to be determined, which in this example is accomplished with the use of a detector array 401. In general, three or more measurements are acquired by the detector to pinpoint the source 404, 103 of the initial gamma photon. This is accomplished with the use of reconstruction methods that essentially determine the intersection of the backprojected cones. This intersection represents the most probable location of the radioactive material.

For each coincidence event, the spatial coordinates for two or more vertices are identified along with the energy deposited in the detector at the associated vertices. In some cases, the first point of interaction is distinguishable from the second point of interaction due to the energy partitioning according to the physics of Compton scattering. In other cases it will not be possible to distinguish which is the first interaction vertex and which is the second interaction vertex. In cases with more than two interaction vertices in coincidence it is unknown what vertex is the first, second, third, etc. For those cases where it is possible to assign an unambiguous first interaction point, that unambiguous first interaction point is used as the origin of the backprojection cone. The axis of the cone is established as the line from the first vertex to the second interaction vertex. The backprojection cone 403 is then the cone originating from the origin with an axis to cone surface angle equal to $\phi$ as calculated from equation 1. The energy of the incident photon ($hv_0$) is chosen 605 from the table of possible emission lines as the hypothetical incident energy and the energy of the scattered photon (hv) is the energy of the incident photon minus the measured interaction energy at the first vertex.

For those cases where it is not possible to assign an unambiguous first interaction point, two projections are calculated with each vertex used as the origin of the backprojection cone. The axis of the cone is established as the line from the assumed first vertex to the remaining second interaction vertex. The backprojection cone is then the cone originating from the origin with an axis to cone surface angle equal to $\phi$ as calculated from equation 1. The energy of the incident photon ($hv_0$) is chosen from the table of possible emission lines as the hypothetical incident energy and the energy of the scattered photon (hv) is the energy of the incident photon minus the measured interaction energy at the first vertex. For events with more than two coincidence vertices, each vertex will be used as the origin with the line to each other vertex as the axis. In configurations where not all the detectors produce an energy measurement, only the detector events that have energy measurement are used as origins for backprojection cones. One means of measuring overlap of calculated backprojection cones is to fill the image space with backprojection cones and look for the region of maximum overlap 401, 405. From the measured data set the set of hypothetical emission lines 502 from a single radioisotope or a set of known related radioisotopes (for example as might be found in a nuclear weapon with a mix of radioisotopes and daughter radioisotopes) compatible with the data is identified. The backprojection cones 503 are calculated for each of the hypothetical emission lines for each of the event data. The backprojection cones 503 are added 504 to an image space resulting in an image with relatively uniform background. The relatively uniform background is a result of the backprojection cones that do not correlate with the actual energies and directions of the gamma rays that produced the event data. This background is spatially uncorrelated because on average the incorrect cones direction and angles will be random. If that radioisotope is present then the set of correct backprojection cones will intersect at a point corresponding to the location of the radioisotope. Examination of the image space for such a region of maximum intensity 505 corresponds with a positive identification of the presence and position of the radioisotope 506. If no region of enhanced image intensity is present another possible radioisotope can be used to process the data. The system may examine all possible radioisotopes in its library if necessary to find the source of radiation.

Figure 6:
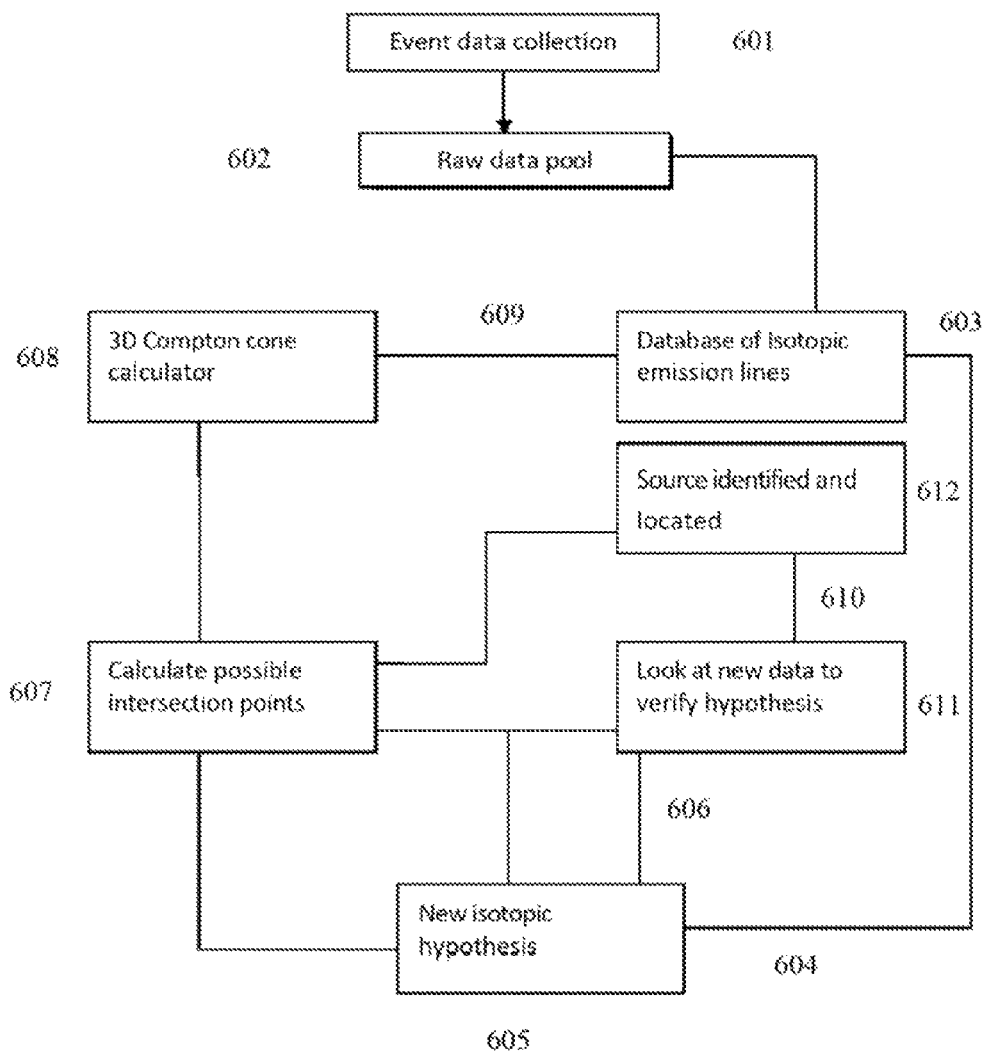
FIG. 6 is a flow chart showing the data acquisition, analysis and decision making paths for identification of a radioisotope.
Figure 7:
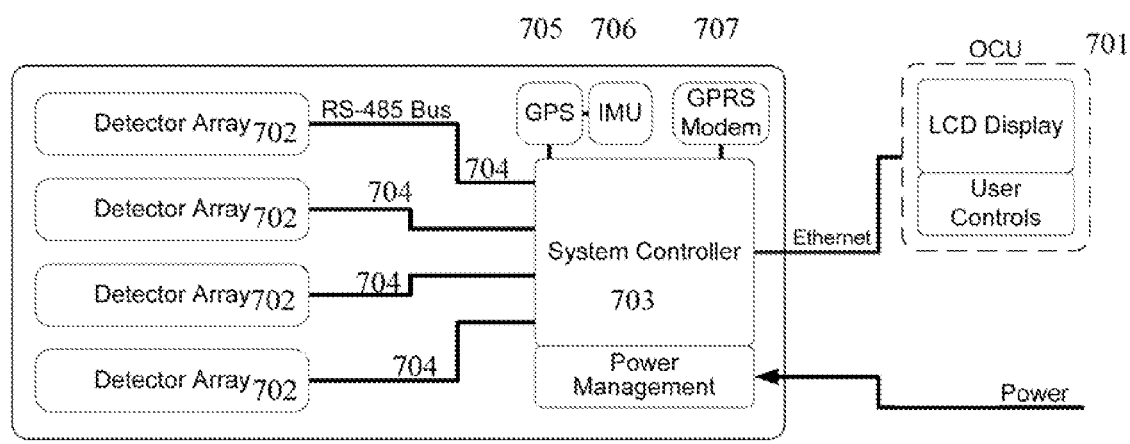
FIG. 7 is a diagram of the overview of an embodiment of how the system would be configured.
Figure 8:
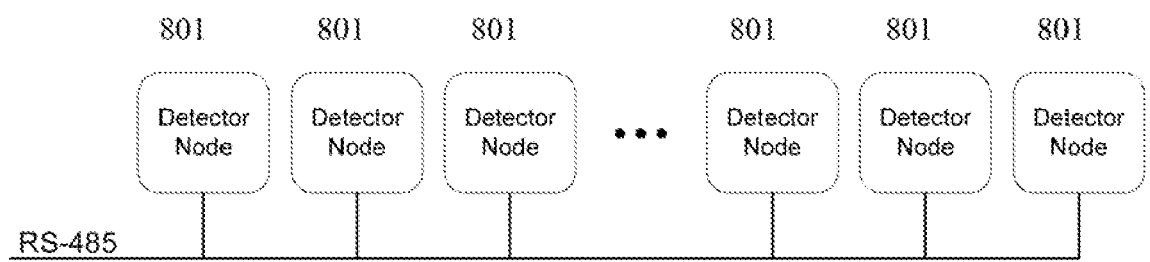
FIG. 8 is a diagram of the architecture of an embodiment of how the detector array would be configured.
Figure 9:
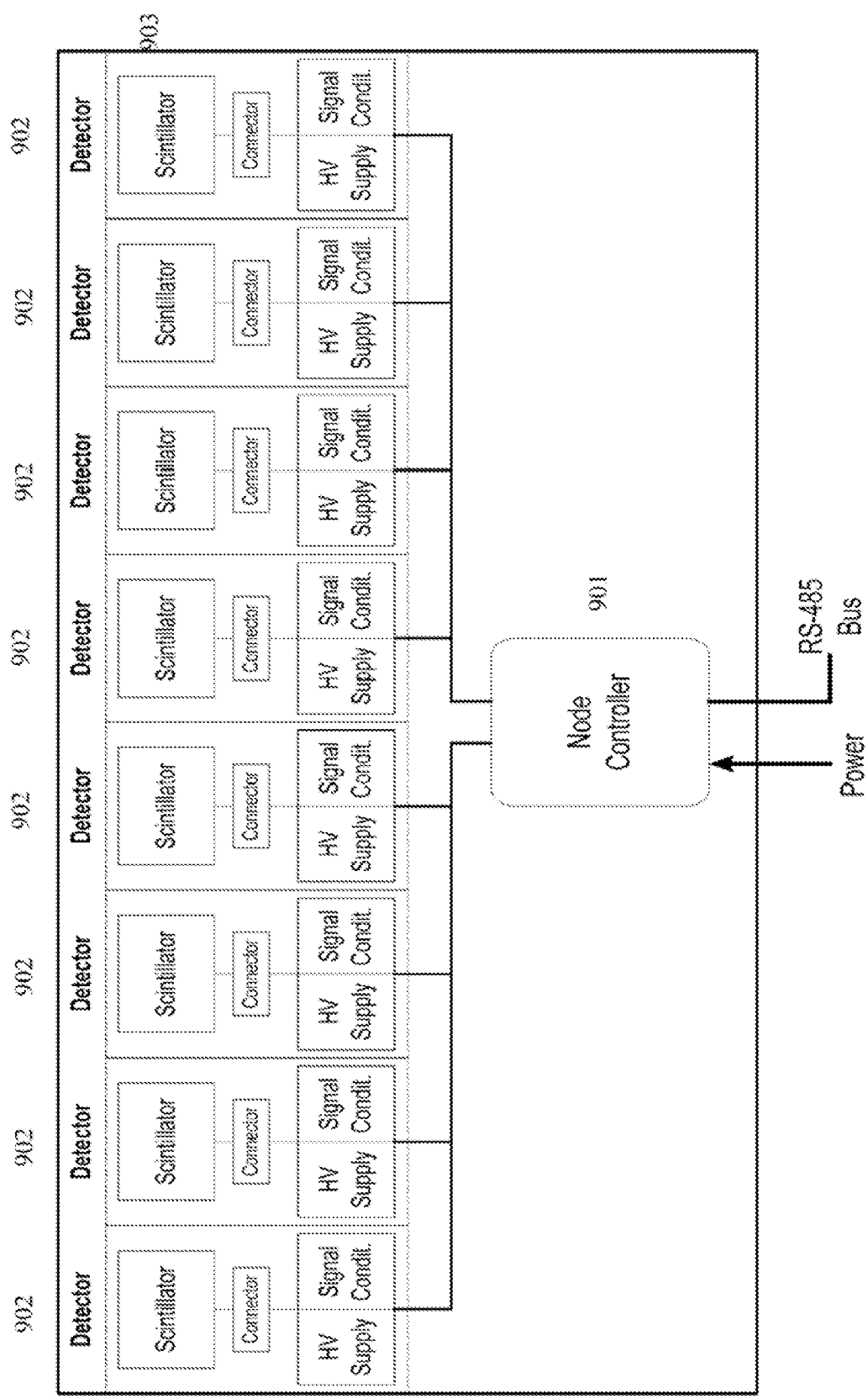
FIG. 9 is a diagram of the architecture of an embodiment of how a detector node would be configured.

One embodiment of an evaluation process follows the flow chart of FIG. 6. In this process backprojection cones are projected into an image space. Regions of overlap are identified for the set of backprojected cones. Additional events are backprojected into the image space and areas of multiple overlap identified. This process looks for regions of overlap for multiple possible events 607. When regions are identified they are stored and event cones that do not produce overlap are recalculated 611 using an alternative emission line hypothesis 605. In this manner the data set is searched through for possible radioisotopes that result in a region of multiple overlap. If no region of multiple overlap is identified, the process begins again with another radioisotope chosen for hypothetical emission lines.

Additional means common in imaging techniques can be used to create or explore the overlap space of the backprojection cones. A reconstruction algorithm for the linear superposition method is as follows. First, the algorithm constructs conical shells arising from the backprojections. This procedure is executed using spherical harmonic expansions and coordinate transformations for different coordinate systems that are specific to each detector. Other geometric approaches for constructing the shells are known. The algorithm then assigns unit amplitudes to the shells. Linear superposition of these shells in the image space will sum the amplitudes where multiple shells intersect. The amplitudes will therefore be proportional to the number of events (cones) that coincide (intersect) in space. Identification of the 3D location of the source will therefore be produced.

Backprojection of cones is one representation of backprojection data. Backprojection data is data that represents the possible trajectory paths that the incoming gamma ray may have followed that are consistent with the measured event data. Geometric cones in Cartesian coordinates may be used as well as, for example, other representations from cylindrical or spherical coordinates, special mathematical functions or representations in less than three dimensions. If the source location is known to lie in a plane (e.g. know to be on the surface) then backprojection data may be lines rather than cones.

Matrix methods for Compton search array reconstruction may use multiple spherical coordinate systems with coordinate transformations between systems. Iterative solution methods are combined with a generalized voxel in the reconstruction algorithm.

Matrix methods are a straightforward approach for reconstructing images from tomographic or similar data sets. The reconstruction problem is formulated as a transformation between the space/source distribution to be imaged and the response of the detectors. This transformation is a function of the geometry of the photon paths and the detector positions. By expressing the transformation as a set of linear equations (i.e., the projection matrix), the reconstruction problem can be solved using matrix algebra (e.g., matrix inversion). Matrix reconstruction is sometimes called the algebraic reconstruction technique (ART).

Matrix inversion methods have been presented for Compton cameras. Symmetries in the reconstruction problem were used to simplify the algorithm. The sampling geometry consisted of nested hemispherical shells sectioned into a grid of voxels of uniform angular size ($\Delta\theta$ and $\Delta\phi$). The voxels were approximated with polyhedrons to compute the relationship between the image space and the projection matrix. Finally, the 3D spatial computations were simplified by transforming the matrices into the 2D Fourier domain and solving the matrix equation with an iterative reconstruction algorithm. Iterative solution of matrix equations offers several advantages in reconstruction problems, particularly for very large or very sparse matrices where matrix inversion is difficult or inaccurate.

Direct linear superposition of backprojected images can be an effective reconstruction method, similar to a triangulation method. For Compton scattering, the backprojected images would be comprised of the conical shells representing regions with a high probability of containing a radioactive source. Superposition of these shells defines regions of higher probability (i.e., where the shells intersect) for location of the source distribution. Backprojection algorithms that use linear superposition (summation over all detected events) are known in the art for Compton scattering data.

One embodiment of the system operates in the following manner. A network of small radiation detectors 101 with 3-D position readout are dispersed preferably around the perimeter of the area to be controlled. These detectors are networked together and feed their data to a central processing station. If a radiation source is present, several (at least about 3) Compton scatter events (at least the primary and secondary interaction vertices and the energy of the primary interaction) are recorded from the network. In each detector we do not know which interaction vertex is the primary and which interaction vertex is the secondary. Coincidence within each detector module tells us that the events are part of the same Compton interaction event. The event rate can be very slow and events in multiple detectors are accumulated for analysis over any desired data acquisition time used to control the area.

When multiple events are recorded the data are analyzed to compute possible Compton projection cones from the vertices. An assumption is made that the events are from a particular radioisotope 502 with emissions equal or greater energy than measured by the sum of the energies for the two coincident Compton vertices. For example, if a coincidence produces a sum of energy for an event of 700 keV, we compute possible trajectories for known radioisotope gamma rays, for the radioisotope hypothesis, greater than or equal to 700 keV. Using the proposed energies of the suspected gamma rays, the projection cones are analyzed to determine if a single point of intersection exists (to within error calculated from known energy and spatial resolutions of the detector). If a true single source of radiation is emitting the radiation at that energy, then a single point of intersection will be found by the cone projection analysis. If the events are random then the probability of producing a single interaction point will be very small. Additional events in any case can bring false positives to any desired lower limit. A threshold level can be set to trigger identification of the radiation source.

Multiple energies from the analysis data base are used to see if the projection cones produce a single focal point of interaction. If multiple energies are known to be emitted from a suspected source then multiple energies can be tested (consistent with emission energy larger or equal to the detected energy). When a single focal point is detected, it indicates that a particular isotope (that associated with the energies used to analyze the data) is present and the location of the source is identified as that detected point.

If the system is deployed around the perimeter of a control area, the system has the highest sensitivity for sources located within the perimeter but is still sensitive to sources outside the perimeter. The system has superior localization because the detectors are situated at various locations around the control area and angular dependent resolution is combined from those multiple positions. Conventional detectors situated at a single location will have difficulty localizing a source that is more distant from the detector. Because the detectors are small modules, the system can be expanded by adding more detectors modules at more locations to improve sensitivity or to monitor a larger area.

An efficient and robust method is disclosed for finding the location of hidden and/or shielded radioactive materials in buildings and outdoor areas based on the principles of Compton scattering. Specific applications for this technology include the control of nuclear materials in processing and power plants; surveys of warehouses, bunkers, and other storage facilities for locating strategic nuclear materials; and the monitoring of transportation facilities and other areas for conventional explosives mixed with radioactive materials ("dirty bombs").

In a similar manner, the Compton search array would use three or more widely spaced detectors to triangulate on the location of radioactive material. Note the intersection of two cones would form a line curving in three dimensions. The addition of a third cone produces additional lines, with the source location defined by the intersection of either the three conical surfaces or the corresponding set of two-cone lines. Backprojected cones from additional detectors would further refine the location determination.

Since the energy of the initial gamma photon is required for determining the deflection angle, one mode of operation for the Compton search array would be to look for specific radionuclides (e.g., plutonium) with distinct peaks in their gamma ray spectra. Alternatively, a gamma ray spectrometer could be used concurrently with the Compton search array to identify the radioactive materials and their strongest gamma ray peaks.

Several reconstruction methods are available for analyzing data from the disclosed Compton search array. Two example approaches that have been used for Compton reconstruction are matrix methods and linear superposition. Any computational method for reconstructing the backprojected cones in three-dimensional space and determining the intersection points of the cones may be used. The reconstruction method accommodates arbitrarily positioned detectors, and therefore a variety of imaging volumes and multiple cone geometries. Spreading of the cones due to energy and position uncertainties would also require consideration, and a "probability of location" analysis may be used since multiple intersection points may result from events detected from gamma rays of different energies.

The initial energy of the gamma ray is treated as unknown. Search algorithms based on the known physical distributions, attenuation and energy dependent detector response provide the most optimum searching methods for the actual gamma ray energies. These search algorithms involve searching for solutions causing multiple events backprojections to intersect.

Because of their similarity, reconstruction methods developed for Compton cameras and SPECT imaging systems may be adaptable to Compton search array data. The majority of reconstruction methods developed for Compton imagers use the backprojection method. The backprojection method is based on the physics of Compton scattering, and is often combined with other tomographic methods such as line integrals, Radon inversion, Fourier transform inversion, and iterative techniques. Methods have also been developed to facilitate reconstruction of backprojections using spherical harmonic expansions.

In backprojection, Compton scattering is analyzed in a reverse fashion. Measuring the angle and energy of the Compton-scattered photon defines a conical surface in space from which the incident photon originated. Uncertainties in both the angular and energy measurements, however, convert the idealized conical surface into a more realistic conical shell. This shell is the region in space defined by the probe to contain the photon source. The backprojection method reconstructs these conical surfaces or shells from multiple detection events (photons). The intersections of the surfaces or shell volumes pinpoint the most probable locations of the emission sources.

A Compton search array would be configured to surround the area of inspection as much as practical. This may include the placement of detectors at different elevations (stair platforms, roof supports, and ceilings) as well as floor (or ground) positions. The reconstruction is fully three-dimensional with variable reconstruction geometry. In contrast to the Compton camera, the Compton search array will sample gamma rays from a much wider range of angles. In tomography, greater coverage typically results in more accurate and robust image reconstruction.

In another embodiment the detector system operates at a single-point-of-observation detector location with 3 dimensional event localization capability and event energy information. The detector can be any such system capable of delivering such event data. The detector or collection of detectors will be able to measure two interaction vertices in coincidence for a single event. A monolithic detector structure with this operational characteristic can be constructed using a variety of techniques known to those skilled in the art such as but not limited to; light segmentation, multiple charge collection electrodes or time of flight measurements. Similarly a segmented detector structure can perform the data collection using segmented scintillators, solid state detectors or gaseous media. In general the detectors can consist of scintillators, solids state detectors, liquid scintillators, liquid charge drift systems, gaseous scintillators or gaseous charge drift systems. It will be obvious to those having skill in the art that many changes may be made to the details of the above-described detector without departing from the underlying principles of the invention.

In general when using a detector system with a single point of observation the final localization information will be limited to direction to the source location. If the single-point-of-observation detector is mobile then additional localization will be possible if the event stream is sampled from multiple locations. The event stream can be sampled along a continuous path as the detector is moved or can be sampled from observation point to observation point. When observing with a mobile or transportable system, a Global Positioning System (GPS) for detector position and an inertial measurement unit (IMU) for detector orientation can be used to provide better absolute position information for events and for final source localization. An IMU works by detecting the current rate of acceleration, as well as changes in rotational attributes, including pitch, roll and yaw. This data may then be fed into a computer, which calculates the current speed and position, given a known initial speed and position. IMUs may be only one component of a navigation system. Other systems may be included and their information may be used in place of IMU data or used to correct the inaccuracies that IMUs inevitably suffer. Such systems are GPS, gravity sensors (for local vertical), external speed sensors (to compensate for velocity drift), a barometer for altitude correction and a magnetic compass.

The method of search can follow several possible strategies. From a single point of search it might be advantageous to project cones in polar or cylindrical coordinates. Any coordinate system can be used, but some will be more conducive for computation of different particular situations. Cartesian coordinates might be preferred for a system with multiple detector locations or a moving detector system.

Search methods can include the actual energy measured for an event as a possible solution along with hypothetical energies associated with a particular isotope used for other events. To enhance the localization and overlap, the angular error can be calculated for each event according to the hypothesis or the actual energy measured. In general if the actual energy measured is used the angular error will be larger due to statistical error in the total energy. For hypothetical energies it is assumed that the energy is either completely correct or completely wrong. Energies that are completely wrong will not lead to geometric correlation. In some cases it is possible that the photons could Compton scatter within a selected angular range. The search algorithm could use this to compute the possible cone projections using a range of potential scatter angles.

The image quality and resultant location accuracy from the Compton search array will be dependent on the number of events detected. Actual angular resolution is not equal to the angular resolution of the imaging systems for a single event. System resolution will be better than from a single event and will be statistically improving with number of true events detected. Since geometric correlation is used, the nominal direction determination of the system will be that of maximum correlation while the resolution will be determined by statistical variation of that data set.

In one embodiment of the search, the mix of unknown energies to use in a hypothetical search allows each data set to stand on its own in conjunction with hypothetical energies for other events. When doing this the overlap region may be blurred to account for different errors among the different possible solutions cones. The blurring algorithm may account for the general resolution inaccuracies and may be a probability based distribution of locations. Those skilled in the art would be able to utilize a variety of techniques to account for the limited resolution blurring.

Additional parameters may be incorporated into the search process based on the knowledge about their relations to the physics of the measurement process. For example additional information that may be added to the search analysis include: singles rates, singles rate detector dependent, single rate detector side dependent, energy values from singles, energy from coincidences, probability of gamma ray energy emission, and mix of energies in coincidence. In addition there could be physical constraints placed upon the search analysis such as requiring the source location to be limited to a certain area (e.g. limited to within a cargo container or vehicle). If more flux is on one side of the detector, some indication of the origin is possible. One searches on solutions that project into this direction rather than all directions. If the source will be known to be located on a plane, then solution searches will be restricted to solution sets that overlap that plane and projection of lines rather than cones will be sufficient. This will be the case of a detector in the open looking for sources when there are no means of elevation (hills, buildings, flying vehicles, etc.) In a more sophisticated system the ground contour could be mapped and a viable location space defined to limit searching that could be more sophisticated than a plane, could include curved surfaces like hills or partial 3D areas such as buildings. The examples and embodiments disclosed herein are to be construed as merely illustrative and not a limitation of the scope of the present invention in any way.

The equation for Compton scattering relates the angle the photon is deflected from its path ($\phi$) to the energies of the scattered (hv) and incident ($hv_0$) photons. The angle and event vertices provide the basis for all reconstruction algorithms involving Compton scattering. The data E1 and E2 measured energy are the energies measured by the detector system.

In one embodiment the search method operates by searching the possible source type and location solution space to find one that maximizes the likelihood that a source type and source location could account for the measured data. The search algorithm proposes a hypothesis for source material, and thus a collection of possible gamma ray lines. We then test the hypothesis on the data to see if there is any geometric correlation. We test other hypotheses and compare to determine what the most likely source material is and identify the location from overlap of the back-projected cones. We add additional data as it becomes available to either validate the leading hypothesis or it may give credence to an alternative hypothesis. When multiple events are correlated to a particular direction a solution certainty can be computed. Different thresholds of certainty can provide different alarms to users.

The search method is adaptable to incorporate additional peripheral information to increase accuracy of the detection system. For example, the detector could experience higher flux on one face of the detector than the others. This directional evidence may lead the algorithm to focus on a more confined solution space and thus a more efficient final solution. The known distribution of singles energy and spatial distribution may be used to modify the prioritization of the search algorithm. Also, if there is a specific direction of interest the system can probe that direction of search space through algorithmic methods while the detector stays active to possible sources in all directions. Sources from more than one location or more than one source material can also be identified.

Spatial resolution for this method is superior to conventional Compton camera methods. The errors in scattering angle associated with conventional Compton cameras are primarily determined by the uncertainty of the measurement of the initial gamma ray energy and the uncertainty in the scattered photon. As noted in Equation 1, the angle is dependent on knowledge of both the initial total energy of the incoming gamma ray and the energy of the scattered gamma ray, thus the angular error is influenced by both the error of the initial total energy of the incoming gamma ray and the error of the energy of the scattered gamma ray.

Conventional Compton cameras rely on the measured total energy, $E_1+E_2$, and measured scattered energy, $E_2$. Error in the computed angle is dependent on the errors in both of these measured energies. In absolute terms (keV) the uncertainty in the full energy, $E_1+E_2$ is greater because the initial gamma ray is always higher energy than the scattered gamma ray, $E_2$. The analysis does not require full energy events, and can use more detected events, for example, Compton then Compton rather than Compton then photoelectric, without the concerns of lost energy from traditional Compton imagers.

When desired, the angular field of view can be controlled electronically. When a restricted field of view is desired the search for solutions can be constrained to only within that field of view. For example if there is a suspected source location we can more quickly determine if radiation is being emitted from that location by requiring only proposed solutions that overlap (within resolution constraints) with that location. One further feature is that, should the suspect location not be the correct one, further analysis of the captured data without the imposed restriction could yield the true source location. That would not be possible for a system that had a physically restricted field of view.

If no hypothesis generated by the search algorithm will provide geometric correlation, the system can still operate as a conventional Compton camera to see if the lower resolution imaging will provide an intersection of overlap, indicating a possible source of either some not listed material or perhaps shielding, such that only secondary scattered gamma rays are emerging from the shielding. In either case, systems that rely on full energy capture for identification will fail to identify the material. If the source material is not in standard libraries, it will not be identified even if full energies are detected. In such a case, operating as a Compton camera, the system may still able to provide the alarm and source location for further investigation to follow.

False alarm rates are very low. Not only is geometric correlation hard to achieve by random cone projections, but since the detector is 4 pi sensitive, even if a random cone projection passes threshold, it would still have to intersect with a viable object to be a false alarm, i.e. if the random cone projection was in the direction over the detector where no objects were located.

In one embodiment of the system, the system may contain a primary Operator Control Unit (OCU) 701 that may be based on a single board computer (SBC). The OCU 701 will allow the user to operate the system and receive radiation detection status and location information.

The system controller 703 may be based upon a motherboard such as the Systel IPC 4472-4U Fault Resilient Rack Mount Military Computer with a 7 Slot ATX Active Motherboard. The IPC 4472 features;
  Shock mounted drive bays and motherboard
  Positive pressure front cooling with one 102 CFM ball bearing fan and 2 rear I/O fans
  Firmly held plug-in cards
  Internal chassis bracing
  Wire bridges to eliminate the need for stick-on tyrap holders The system controller interfaces 704 to the Detector Array 702 using, for example, a MOXA CP-134U V2 Universal PCI Multiport Serial Board that has 4 RS-422/485 serial ports, each capable of data rates up to 921.6 Kbps. For this system the ports are configured in multidrop, 4-wire, RS-485 modes capable of interfacing to multiple nodes per port.

The system controller may use a combined Global Positioning System (GPS) 705 and Inertial Measurement Unit (IMU) 706, for example the one provided by NovAtel, for location of the system. Using NovAtel's Synchronized Position Attitude Navigation (SPAN) Technology featuring tight integration of a GPS and IMU would allow the system to provide uninterrupted position and attitude information during short periods of GPS outage, or when less than four satellites are received. From this position and attitude information the system is able to determine the relative location of a radiation source.

Communication capability of the system could be provided by a MultiTech Systems MTCBA-G-U-F2 GPRS wireless modem 707. This standalone modem provides wireless data communication based on industry-standard open interfaces. Some of the key features of the modem are:
  GPRS Class 10
  Dual-band 850/1900 or 900/1800 MHz GSM/GPRS
  Packet data up to 85.6K bps
  Circuit-switched data up to 14.4K bps transparent and non-transparent
  Short Message Services (SMS)
  USB interfaces
  SMA antenna connector and SIM socket
  Serial interface supports DTE speeds to 115.2K bps
  AT command compatible
  MNP2 error correction, V.42bis compression
  PTCRB certified
  Carrier approved In one embodiment the system has four detector arrays 702 each of which have 31 detector nodes. This gives the system a total of 992 individual scintillation detectors in this embodiment. The system may be built using Detector Nodes 801. In one embodiment the detector 902 is a Thallium-activated sodium iodide scintillation detector, i.e. an NaI(Tl) crystal coupled to a photomultiplier tube (PMT) 903.

The node controller 901 may be based upon the Xilinx Spartan-3 FPGA. This allows for flexibility in the node design and allows for a distributed architecture. This distributed architecture is well suited for determining correlation of events in a single node or between multiple nodes, providing a 10 us time resolution for coincidence identification.

The above description discloses the invention including preferred embodiments thereof. The examples and embodiments disclosed herein are to be construed as merely illustrative and not a limitation of the scope of the present invention in any way. It will be obvious to those having skill in the art that many changes may be made to the details of the above-described embodiments without departing from the underlying principles of the invention.

What is claimed is:

1. A radioisotope identification device comprising:
  a gamma-ray detector having three dimensional vertex localization;
  said gamma-ray detector producing a first three dimensional vertex localization and a second three dimensional vertex localization corresponding to two interaction locations resulting from one incident gamma-ray event;
  said gamma-ray detector having a first deposited energy output for each said gamma-ray event;
  wherein said gamma-ray detector is configured to produce an event datum containing said first deposited energy output, said first three dimensional vertex localization and said second three dimensional vertex localization for each gamma-ray event;
  a computer-readable storage media, wherein a data set of emission gamma-ray energies characteristic of suspect radioisotopes is stored on said computer-readable storage media;
  a system controller comprising a processor wherein said system controller is communicatively coupled to said gamma-ray detector;
  a computational processor communicatively coupled to said computer-readable storage media;
  wherein said computational processor is configured to select a first event datum and a second event datum;
  wherein said computational processor is configured to select a first hypothetical emission gamma-ray energy for said first event datum and to select a second hypothetical emission gamma-ray energy for said second event datum;
  wherein said computational processor is configured to calculate first backprojection data using value of said first hypothetical emission gamma-ray energy and value of said first deposited energy output, said first three dimensional vertex localization and said second three dimensional vertex localization for said first event datum and to calculate second backprojection data using value of said second hypothetical emission gamma-ray energy and value of said first deposited energy output, said first three dimensional vertex localization and said second three dimensional vertex localization for said second event datum;

wherein said computational processor is configured to calculate directional correlation between said first backprojection data for said first event datum and said second backprojection data for said second event datum; and an output from said computational processor indicating presence of radioisotope.

2. The radioisotope identification device of claim 1 wherein:
said gamma-ray detector is mobile.

3. The radioisotope identification device of claim 2 further comprising:
a GPS system physically coupled to said gamma-ray detector and communicatively coupled to said system controller.

4. The radioisotope identification device of claim 2 further comprising:
an IMU system physically coupled to said gamma-ray detector and communicatively coupled to said system controller.

5. The radioisotope identification device of claim 2 further comprising:
a GPS system physically coupled to said gamma-ray detector and communicatively coupled to said computational processor.

6. The radioisotope identification device of claim 2 further comprising:
an IMU system physically coupled to said gamma-ray detector and communicatively coupled to said computational processor.

7. The radioisotope identification device of claim 1 wherein:
said computational processor is a distributed processor.

8. The radioisotope identification device of claim 1 wherein:
said gamma-ray detectors is a NaI type scintillator.

9. The radioisotope identification device of claim 1 wherein:
said gamma-ray detectors is a CsI type scintillator.

10. The radioisotope identification device of claim 1 wherein:
said gamma-ray detectors is a CZT type solid state detector.

11. The radioisotope identification device of claim 1 wherein:
said computational processor is communicatively coupled to said gamma ray detector through said system controller.

12. The radioisotope identification device of claim 1 wherein:
said computational processor is also said system controller.

13. The radioisotope identification device of claim 1 wherein:
said event datum is stored on said computer-readable storage media.

14. The radioisotope identification device of claim 1 further comprising:
a second gamma-ray detector having three dimensional vertex localization and communicatively coupled to said system controller.

15. A radioisotope identification device comprising:
a plurality of gamma-ray detectors;
a first gamma-ray detector measuring interaction energy from gamma-ray interaction within said first gamma-ray detector wherein said first gamma-ray detector is configured to produce a first event datum containing interaction energy output for gamma-ray interaction within said first gamma-ray detector;
a second gamma-ray detector measuring interaction energy from gamma-ray interaction within said second gamma-ray detector wherein said second gamma-ray detector is configured to produce a second event datum containing interaction energy output for gamma-ray interaction within said second gamma-ray detector;
a computer-readable storage media;
wherein a data set of emission gamma-ray energies characteristic of suspect radioisotopes is stored on said computer-readable storage media;
a system controller comprising a processor wherein said system controller is communicatively coupled to said plurality of gamma-ray detectors;
a computational processor communicatively coupled to said computer-readable storage media;
wherein said computational processor is configured to receive said first event datum and said second event datum;
wherein said computational processor is configured to select a first hypothetical emission gamma-ray energy for said first event datum and to select a second hypothetical emission gamma-ray energy for said second event datum;
wherein said computational processor is configured to calculate first backprojection data using value of said first hypothetical emission gamma-ray energy and identification of first gamma ray detector for said first event datum and to calculate second backprojection data using value of said second hypothetical emission gamma-ray energy and identification of second gamma ray detector for said second event datum;
wherein said computational processor is configured to calculate directional correlation between said first backprojection data and said second backprojection data; and
an output from said computational processor indicating presence of radioisotope.

16. The radioisotope identification device of claim 15 wherein:
at least one of said plurality of gamma-ray detectors is mobile.

17. The radioisotope identification device of claim 16 further comprising:
a GPS system physically coupled to said at least one of said plurality of gamma-ray detectors and communicatively coupled to said system controller.

18. The radioisotope identification device of claim 16 further comprising:
an IMU system physically coupled to said at least one of said plurality of gamma-ray detectors and communicatively coupled to said system controller.

19. The radioisotope identification device of claim 16 further comprising:
a GPS system physically coupled to said at least one of said plurality of gamma-ray detectors and communicatively coupled to said computational processor.

20. The radioisotope identification device of claim 16 further comprising:
an IMU system physically coupled to said at least one of said plurality of gamma-ray detectors and communicatively coupled to said computational processor.

21. A method of radioisotope identification comprising:
creating event data by measuring with a detector three dimensional vertex localization data of gamma-ray events;
each of said event data having a first Compton interaction vertex and interaction energy;
each of said event data having a second interaction vertex;
transferring said event data to a computer;
a) using said computer to select a first hypothetical emission gamma-ray energy for a first event datum;
b) using said computer to select a second hypothetical emission gamma-ray energy for a second event datum;
c) calculating on said computer first backprojection data for said first event datum using said first event datum combined with said first hypothetical emission gamma-ray energy;
d) calculating on said computer second backprojection data for said second event datum using said second event datum combined with said second hypothetical emission gamma-ray energy;
e) measuring on said computer the spatial correlation of said calculated first backprojection data and second backprojection data; and
f) identifying presence of radioisotope with said spatial correlation.

22. The method of claim 21 further comprising:
storing a data set of emission gamma-ray energies characteristic of suspect radioisotopes on a computer-readable storage media communicatively coupled to said computer.

23. The method of claim 21 further comprising:
steps a), b), c), d), e) and f) are iterated for alternative said hypothetical emission gamma-ray energies; and
identifying most significant said spatial correlation.

* * * * *